(12) United States Patent
Lu et al.

(10) Patent No.: US 8,478,663 B2
(45) Date of Patent: Jul. 2, 2013

(54) FIT RECOMMENDATION VIA COLLABORATIVE INFERENCE

(75) Inventors: Zhidong Lu, Boxborough, MA (US); John Stauffer, Framingham, MA (US)

(73) Assignee: True Fit Corporation, Woburn, MA (US)

( * ) Notice: Subject to any disclaimer, the term of this patent is extended or adjusted under 35 U.S.C. 154(b) by 0 days.

(21) Appl. No.: 13/192,617

(22) Filed: Jul. 28, 2011

(65) Prior Publication Data
US 2012/0030061 A1 Feb. 2, 2012

Related U.S. Application Data

(60) Provisional application No. 61/368,401, filed on Jul. 28, 2010.

(51) Int. Cl.
*G06Q 30/00* (2012.01)
(52) U.S. Cl.
USPC .......................................... 705/26.7; 705/26.1
(58) Field of Classification Search
USPC ...................................... 705/26.1, 26.7, 27.1
See application file for complete search history.

(56) References Cited

U.S. PATENT DOCUMENTS

| | | | |
|---|---|---|---|
| 5,757,661 A | 5/1998 | Surville | |
| 5,930,769 A * | 7/1999 | Rose | 705/26.81 |
| 6,665,577 B2 | 12/2003 | Onyshkevych et al. | |
| 6,701,207 B1 | 3/2004 | Gazzuolo | |
| 6,711,455 B1 | 3/2004 | Holloway et al. | |
| 7,242,999 B2 | 7/2007 | Wang | |
| 7,698,170 B1 | 4/2010 | Darr et al. | |
| 2001/0014868 A1 | 8/2001 | Herz et al. | |
| 2002/0188372 A1 | 12/2002 | Lane et al. | |
| 2003/0172004 A1 * | 9/2003 | Anderson | 705/27 |
| 2004/0083142 A1 | 4/2004 | Kozzinn | |
| 2006/0059054 A1 | 3/2006 | Adiseshan | |

(Continued)

OTHER PUBLICATIONS

Chun-Yoon, Jongsuk, "Consumer preferences for size description systems of men's and women's apparel," The Journal of Consumer Affairs, 1995.*
International Search Report and Written Opinion for International Application No. PCT/US10/53615, mailed Dec. 16, 2010.
International Search Report and Written Opinion for International Application No. PCT/US11/45737, mailed Nov. 8, 2011.
International Search Report and Written Opinion for International Application No. PCT/US2011/045719, mailed Dec. 23, 2011.

(Continued)

*Primary Examiner* — Matthew Gart
(74) *Attorney, Agent, or Firm* — Wolf, Greenfield & Sacks, P.C.

(57) ABSTRACT

Some embodiments of the invention provide techniques for recommending a size of a subject item to fit a subject consumer. In some embodiments, clusters of consumers with fit characteristics similar to the subject consumer are identified, using one or more data clustering algorithms, based on any of numerous consumer attributes (e.g., self-reported and/or inferred height, weight, body shape, body characteristics, and/or purchase histories (e.g., consumers with high overlap in terms of sets of products purchased)). Information on other consumers in the cluster may be analyzed to draw conclusions on how different sizes of the subject item may fit the subject consumer. For example, the purchase history of other members of the cluster may be analyzed to determine whether other members purchased a particular size of the item, and if so, the size purchased by the other members may serve as a basis to recommend a size that may best fit the consumer. For example, if other members of the cluster purchased a particular size, then that size may be recommended to the subject consumer, or if other members of the cluster purchased and then returned a particular size (e.g., for being too small), then another (e.g., larger) size may be recommended to the subject consumer.

19 Claims, 4 Drawing Sheets

U.S. PATENT DOCUMENTS

| | | | |
|---|---|---|---|
| 2006/0287877 A1 | 12/2006 | Wannier et al. | |
| 2007/0011173 A1* | 1/2007 | Agostino | 707/10 |
| 2007/0073586 A1 | 3/2007 | Dev et al. | |
| 2007/0168357 A1 | 7/2007 | Mo | |
| 2007/0198120 A1 | 8/2007 | Wannier et al. | |
| 2008/0189194 A1 | 8/2008 | Bentvelzen | |
| 2008/0235114 A1 | 9/2008 | Wannier et al. | |
| 2009/0037295 A1 | 2/2009 | Saul et al. | |
| 2009/0089186 A1 | 4/2009 | Paolini | |
| 2009/0094138 A1 | 4/2009 | Sweitzer et al. | |
| 2009/0144173 A1 | 6/2009 | Mo et al. | |
| 2009/0287452 A1 | 11/2009 | Stanley et al. | |
| 2010/0030578 A1 | 2/2010 | Siddique et al. | |
| 2010/0100455 A1 | 4/2010 | Song | |
| 2010/0169340 A1 | 7/2010 | Kenedy et al. | |

OTHER PUBLICATIONS

International Search Report and Written Opinion for International Application No. PCT/US11/45744, mailed Oct. 28, 2011.

Civil Action No. 07-12335-DPW, Affidavit of J. Romney Evans dated Apr. 9, 2008, filed Apr. 9, 2008.

Civil Action No. 1:12-CV-11006-GAO, Declaration of J. Romney Evans in Support of True Fit Corporation's Motion for Preliminary Injunction dated Aug. 8, 2012, filed Dec. 14, 2012.

Transcript of Hearing on Motion for Preliminary Injunction; Civil Action No 2-cv-11006-GAO, Dec. 17, 2012.

Affidavit of J. Romney Evans, U.S. Appl. No. 13/192,617, dated May 6, 2013.

* cited by examiner

FIT RECOMMENDATION VIA COLLABORATIVE INFERENCE

RELATED APPLICATIONS

This application claims priority to U.S. Provisional Patent Application Ser. No. 61/368,401, filed Jul. 28, 2010, entitled "Fit Recommendation Via Collaborative Inference," which is incorporated herein by reference in its entirety.

FIELD OF INVENTION

This invention relates to providing a recommendation to a consumer regarding a size of an item, such as an item of apparel or shoes, that may best fit the consumer.

BACKGROUND

Conventional systems which provide item fit recommendations (i.e., a prediction regarding which size of a particular item may best fit a particular consumer) rely on detailed technical data on items, such as item dimensions and/or other attributes (e.g., waist circumference, inseam, etc.) Although this technical data can be helpful in making fit recommendations if available, often it is not available for use. For example, often the suppliers of particular items consider technical data on those items proprietary, and may not wish to reveal the technical data to another party for fear that the items may be replicated.

SUMMARY OF INVENTION

In accordance with some embodiments of the invention, techniques are provided for making a fit recommendation regarding an item in an instance where technical data on different sizes of the item is unavailable. In some embodiments, a fit recommendation may be made for a subject consumer with regard to a subject item by identifying one or more clusters of consumers with fit characteristics similar to the subject consumer, and/or clusters of products with purchase histories similar to that of the subject item. Information on consumers in the cluster to which the subject consumer belongs, and/or information on products in the cluster to which the subject item belongs, may be used to draw conclusions on how various sizes of the subject item may fit the subject consumer. As a result, a particular size of the subject item that is predicted to best fit the subject consumer may be recommended to him/her.

In accordance with some embodiments of the invention, one or more data clustering algorithms, such as k-means, hMetis, and/or other conventional or later-developed data clustering algorithms, may be used to identify clusters of consumers defined by any of numerous consumer attributes, such as self-reported and/or inferred height, weight, body shape, body characteristics, and/or purchase histories (e.g., consumers with high overlap in terms of sets of products purchased). In some embodiments of the invention, consumer clusters may be identified separately for different categories of items. For example, for apparel, consumer clusters may be identified separately for shirts, pants, shorts, etc. One or more data clustering algorithms may also be used to identify clusters of products, such as those which are sold successfully to the same individual, or which tend to fit individuals similarly.

In some embodiments of the invention, to make a fit recommendation regarding an item to a consumer belonging to a particular consumer cluster, information relating to other members of that consumer cluster may be analyzed to determine a size to be recommended. For example, the sales history of the other members may be analyzed to determine whether any of the other members successfully purchased a particular size of the item. If so, the size of the item purchased by the other members may serve as a basis for a fit recommendation to the consumer. In some embodiments, a fit recommendation may be accompanied by a "confidence rating," which may reflect the strength of recommendation in light of the underlying facts. For example, if more members of the consumer cluster purchased a particular size successfully, or indicated that the item was a "favorite," then the confidence rating associated with a fit recommendation may be greater.

The techniques described herein may, for example, be employed by an online e-commerce system, installed on a computer system or kiosk (e.g., within a "bricks-and-mortar" store), accessible as a service via a mobile device, etc. Embodiments of the invention are not limited to any particular manner of implementation.

The foregoing is a non-limiting summary of the invention, some embodiments of which are defined by the attached claims.

DETAILED DESCRIPTION

Some embodiments of the invention provide techniques for providing a fit recommendation regarding a particular item when technical data on various sizes of the item is unavailable. For example, some embodiments provide for making a fit recommendation to a subject consumer with regard to a subject item by identifying clusters of consumers with fit characteristics similar to the subject consumer. One or more data clustering algorithms may be used to identify clusters of consumers based on any of numerous consumer attributes, such as self-reported and/or inferred height, weight, body shape, body characteristics, and/or purchase histories (e.g., consumers with high overlap in terms of sets of products purchased). Information on other consumers in the cluster may be analyzed to draw conclusions on how different sizes of the subject item may fit the subject consumer. For example, some embodiments of the invention provide for analyzing the sales history of other members of the cluster to which the subject consumer belongs to determine whether other cluster members purchased a particular size of the item, and if so, the size of the item purchased by the other members may serve as a basis to recommend a size of the item that may best fit the consumer. For example, if other members of the cluster purchased a particular size of the item, then that size may be recommended to the subject consumer, or if other members of the cluster purchased and then returned a particular size of the item (e.g., for being too small), then another (e.g., larger) size may be recommended to the subject consumer. Any of numerous conclusions may be drawn by analyzing information on consumers in a cluster, as embodiments of the invention are not limited in this respect.

Figure 1:
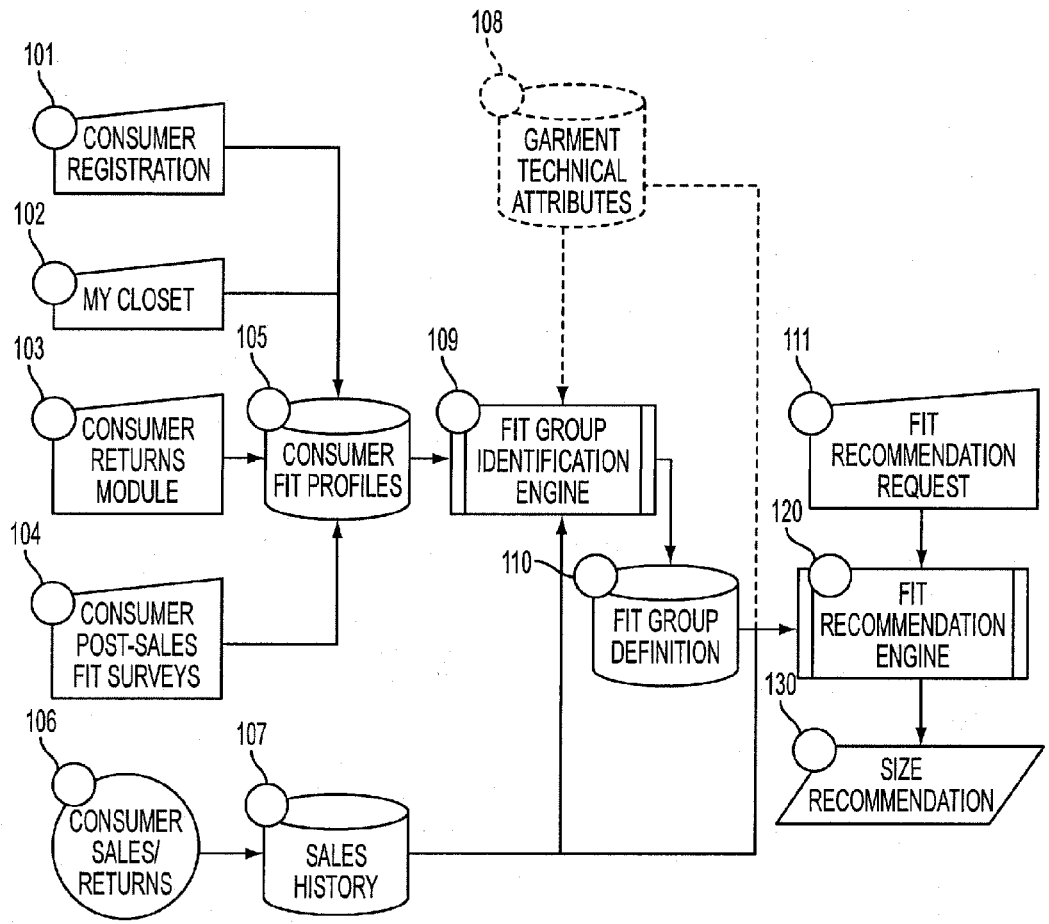
FIG. 1 is a block diagram depicting example components of a system for recommending a size of an item that may fit a consumer, in accordance with some embodiments of the invention.

FIG. 1 depicts an example system for making a fit recommendation to a consumer regarding an item when technical data on sizes of the item is unavailable. The system of FIG. 1 includes components which may each be generically considered to be one or more controllers for performing the functions described below. These controllers may be implemented in any of numerous ways, such as with dedicated hardware and/or by employing one or more processors programmed using software and/or microcode to perform the described functions. When implemented via software, the software code can be executed on any suitable processor or collection of processors, whether provided in a single computer or distributed among multiple computers. Where a controller accepts or provides data for system operation, the data may be stored in a central repository or a plurality of repositories.

The example system depicted in FIG. 1 includes consumer registration controller 101, my closet controller 102, consumer returns controller 103, consumer post-fit sales surveys 104, consumer fit profiles storage facility 105, consumer sales/returns data 106, sales history storage facility 107, garment technical attributes storage facility 108, fit group identification controller 109, fit group definition storage facility 110 and fit recommendation engine controller 120. Some example functions of, and example data transferred between, these components are described below.

Consumer registration controller 101 provides a facility whereby a consumer may register and create a fit profile. For example, using consumer registration controller 101, a consumer may self-report fit-related attributes, such as body measurements, body shape attributes (e.g., stomach shape, seat shape, body shape, etc.), and/or other attributes.

My closet controller 102 allows the consumer to specify one or more items (e.g., apparel, shoes, etc.) which the consumer believes fit(s) him/her well. A specified item may, for example, be one which the consumer already owns, although embodiments of the invention are not limited in this respect. In some embodiments, my closet controller 102 may allow a consumer to specify sizes of individual items (e.g., Arrow Wrinkle-Free Fitted Herringbone Long Sleeve, Size 15 34/35), sizes of items within a brand category (e.g., Arrow Dress Shirt, Size 15 34/35), and/or any other group of items.

Consumer returns controller 103 collects information from a consumer as he/she initiates a return of an item. In some embodiments, consumer returns controller 103 may accept information regarding whether the item is being returned due to fit-related issues and if so the nature of the issue(s) (e.g., waist too tight, leg too short, thigh too loose, etc.). Any of numerous types of information regarding returns may be accepted.

Consumer post-sales fit survey controller 104 collects information from a consumer regarding how items which they have purchased have fit. In some embodiments, survey invitations may be generated and sent (e.g., via email) to a sample group of consumers after they have completed purchases. For example, consumers on which a relatively smaller set of data has already been collected may be sent a survey to fill out. A survey may ask a consumer to rate specific items based on key dimensions. For example, a consumer who purchased pants may be asked to rate waist, hip thigh and/or length measurements, a consumer who purchased shoes may be asked to rate length, width and/or arch support of the shoe, etc. Ratings on any of numerous product dimensions may be requested and/or stored.

In some embodiments, any or all of consumer registration controller 101, my closet controller 102, consumer returns controller 103 and consumer post-sales fit survey controller 104 may be implemented via software code defining presentation of an interface (e.g., for execution by a web browser, e-mail client, and/or other component(s)) to a consumer, and accepting information provided by the consumer for storage. In this respect, consumer fit profile storage facility 105 stores information collected about a consumer's preferences, identified measurements, closet, fit survey, product returns information, etc. by consumer registration controller 101, my closet controller 102, consumer returns controller 103 and consumer post-sales fit survey controller 104. Although depicted in FIG. 1 as a single repository, consumer fit profiles storage facility 105 may store data in any suitable number of repositories.

In the example system shown, consumer sales/returns data 106 includes historical information regarding items that the consumer has purchased and/or returned (e.g., at a particular retailer). Although depicted in FIG. 1 as a single data feed, consumer sales/returns data 6 may comprise any suitable number of datasets, each of which may be stored on any suitable medium and transferred using any suitable technique(s) and/or infrastructure.

Sales history storage facility 107 stores historical sales data for the group of consumers known to the system. The historical sales data may include, for example, information on products sold to consumers, the outcome of those sales (e.g., whether completed successfully or the products were returned, etc.), and other information. Although sales history storage facility 107 is depicted in FIG. 1 as a single repository, it may comprise any suitable number of repositories, as embodiments of the invention are not limited in this respect.

In the example system shown in FIG. 1, information generated by consumer sales/returns controller 106 and sales history controller 107 is provided to fit group identification controller 109 for identification of clusters of consumers. In some embodiments, fit group identification controller 109 identifies clusters of consumers with similar body sizes, shapes and fit preferences, as these clusters of consumers may prove likely to wear similar-sized clothing. Fit group identification controller 109 may identify different clusters of consumers for different types of items, such as different clusters for tops than for bottoms (for apparel), different clusters for sneakers than for sandals (for shoes), etc. Example techniques which may be employed to identify clusters of consumers are described below with reference to FIGS. 3-4. In some embodiments, clusters identified by fit group identification controller 109 are stored using fit group definition storage facility 110, which in turn makes the identified clusters available to fit recommendation controller 120.

As indicated by the dotted lines in FIG. 1, an optional input to fit group identification controller 109 is provided by garment technical attributes storage facility 108. In this respect, garment technical attributes storage facility 108 may supply technical dimension data on certain sizes of items (for which this information is available). Technical dimension data may be collected from any of numerous sources, such as from apparel manufacturers. If present, the technical dimension data may be used both by the fit group identification controller 109 to identify clusters of consumers, and by fit recommendation controller 120 to generate a fit recommendation, as described further below.

Figure 2:
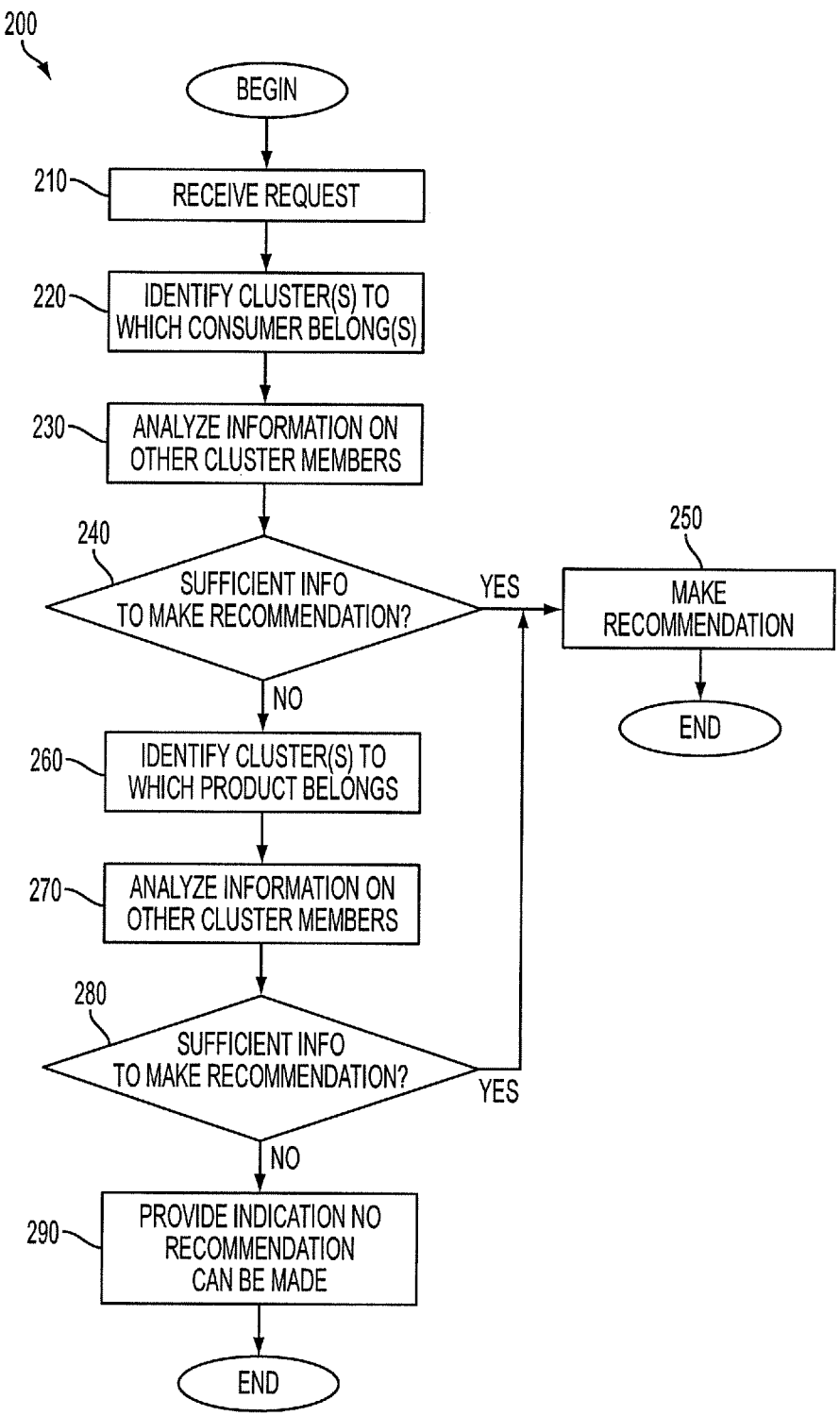
FIG. 2 is a flowchart depicting an example process whereby a recommendation regarding an item may be made to a consumer, according to some embodiments of the invention.

In the example system shown in FIG. 1, fit recommendation controller 120 receives a fit recommendation request 111 and generates size recommendation 130. An example process 200 for generating a size recommendation is depicted in FIG. 2.

Process 200 begins in act 210, in which a request for a recommendation is received. This request may, for example, be received from a system component, such as an online e-commerce site, mobile shopping application, shopping kiosk in a mall or brick and mortar store, etc., or received from any of numerous other entities. A request may, for example, identify a consumer and an item of apparel for which a recommendation is sought.

Process 200 then proceeds to act 220, wherein a cluster to which the identified consumer belongs is identified. A cluster may be defined based on commonality and/or similarity with respect to any of numerous attributes, such as those which may indicate similar fit and style preferences among consumers. For example, attributes could include consumer self-reported and/or inferred body measurements, body shape attributes (e.g., stomach shape, seat shape, body shape, etc.), sales history, and/or one or more other attributes. In the case of sales history, if garment technical attributes are available, the attributes can take into account the actual attributes of the garments. When technical attributes are not available, purchases may be pre-processed to identify clusters of items that have common purchase histories (indicating that they have similar fit characteristics).

Figure 3:
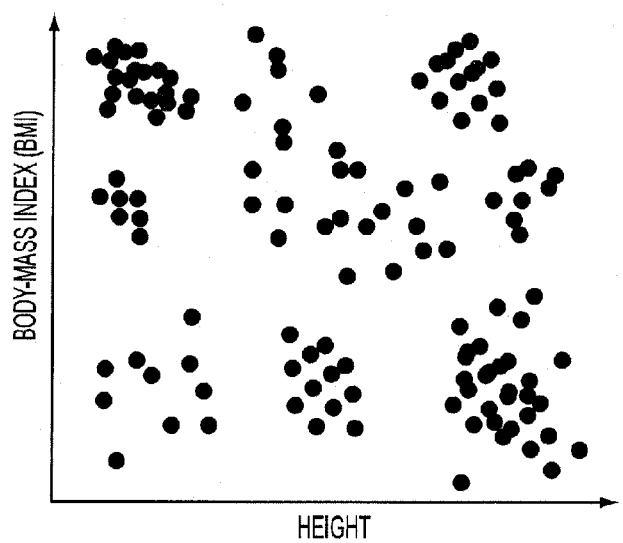
FIG. 3 is a representation of an example distribution of consumers according to selected attributes, according to some embodiments of the invention.
Figure 4:
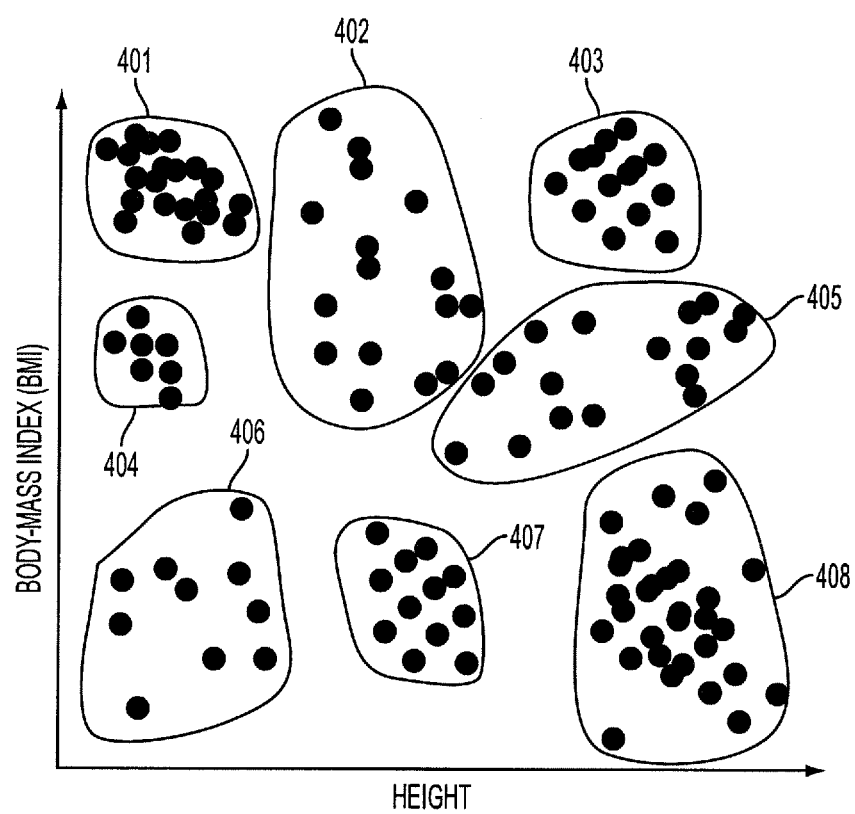
FIG. 4 is a representation of example consumer clusters identified within the distribution depicted in FIG. 2, in accordance with some embodiments of the invention.

An example representation of attributes used to identify clusters among a set of consumers is depicted in FIG. 3. In the simplified example shown in FIG. 3, the attributes include height and Body Mass Index (BMI). FIG. 3 thus depicts a distribution of the sample set of consumers using these attributes. One or more data partitioning algorithms may be used (e.g., executed by fit group identification controller 9, FIG. 1) to identify clusters of consumers from among the distribution shown in FIG. 3. For example, n-Means, hMetis, and/or one or more other data partitioning algorithms, which may be now known or later developed, may be used to identify clusters of consumers most similar to each other with regard to the attributes represented in FIG. 3. FIG. 4 depicts an example in which a data partitioning algorithm has been used to identify eight clusters of consumers from among the distribution depicted in FIG. 3.

It can be seen that not all clusters depicted in FIG. 3 possess the same level of similarity with respect to the attributes represented. For example, the members of group 401 are very localized, while the members of group 405 are more scattered. In some embodiments, the similarity or cohesiveness of each group may be reflected in a confidence rating associated with fit recommendations for members of this cluster, as described below. For example, a consumer determined to be a member of group 405 may receive a fit recommendation with a lower associated confidence rating than a member of group 401 would.

It should be appreciated that although the example described above involves identifying only a single group to which a subject consumer belongs, any suitable number of groups, each defined by any suitable one or more attributes, may be identified. Embodiments of the invention are not limited in this respect.

Returning to FIG. 2, process 200 then proceeds to act 230, wherein information on other members of the cluster to which the consumer belongs is analyzed. For example, in some embodiments a determination may be made whether the item for which a recommendation is sought has been successfully purchased (e.g., not returned) by one or more other members of a cluster to which the consumer belongs, and if so what size was most commonly purchased by those other consumers. Of course, it should be appreciated that embodiments of the invention are not limited to making this specific determination, and that any of numerous conclusions may be drawn by analyzing information on other members of the cluster to which the consumer belongs. As one example, if more than one size of the product was purchased by members of the cluster, then analysis may be performed on whether any size was designated by a cluster member as a favorite (or non-favorite). Embodiments of the invention are not limited to any specific type of analysis.

Process 200 then proceeds to act 240, in which a determination is made whether sufficient information has been gathered to make a recommendation. Sufficient information may not have been gathered, for example, if the analysis of information on other members of the cluster was inconclusive (e.g., if no other members of the cluster successfully purchased the product, etc.). If sufficient information has been gathered, process 200 proceeds to act 250, wherein a recommendation is made. This may be performed in any of numerous ways, such as by causing information indicative of the recommendation to be presented on a display. Embodiments of the invention are not limited to any particular manner of making a fit recommendation.

In some embodiments, a fit recommendation may include not only a size of the item that is predicted to best fit the consumer, but also a confidence rating for the recommended size (e.g., as determined by the cohesiveness of the cluster and/or other factors), and an indication of how the item is likely to fit the consumer along key dimensions. For example, if the item in question is a pair of pants, the recommendation may include an indication of how the pants are likely to fit in the waist, hip, and/or rise areas. If the item is a shirt, the recommendation may include an indication of how the item is likely to fit the consumer in the neck, arm length, etc. Any of numerous types of information may be provided with a recommendation, as embodiments of the invention are not limited in this respect.

If it is determined in act 240 that sufficient information has not been gathered to make a recommendation, process 200 proceeds to act 260, wherein a cluster to which the subject product belongs is identified. In this respect, in much the same way as clusters of consumers are identified based on similar style and fit preferences (e.g., as described above with reference to FIGS. 3-4), clusters of products may be identified based on fit characteristics that are inferred from consumer experience. For example, some embodiments provide for identifying clusters of products based on an analysis of sales history, to identify products that are purchased successfully by the same groups of consumers. For example, if an analysis of sales history data revealed that consumers who successfully purchased Adidas running shoes also successfully purchased New Balance running shoes, then these two brands of running shoes might be grouped into the same cluster, allowing an inference to be drawn that New Balance running shoes have fit characteristics that are similar to those of Adidas running shoes. As a result, even if data describing the dimensions of New Balance running shoes was unavailable, a size of New Balance running shoe could be recommended to a consumer based upon the knowledge that the same size Adidas running shoe has similar fit characteristics. Of course, this example which employs sales history data is merely illustrative, as any suitable information may be employed to identify product clusters.

Process 200 then proceeds to act 270, wherein information on the other products in the cluster to which the subject product belongs is analyzed. In one example, a determination may be made whether any other member of the product cluster to which the subject product belongs has been successfully purchased by other members of the consumer cluster to which the subject consumer belongs, and if so, the size of that product may be identified. In another example, a size for a member of the product cluster that is determined to be equivalent to a size for another member of the cluster may be identified. Extending the example in the previous paragraph to illustrate, an analysis of product sales data might reveal that although both New Balance and Adidas running shoes were both successfully purchased by the same group of consumers and thus placed in the same product cluster, the purchased New Balance shoes were a half-size larger than the corresponding Adidas shoes. Based on this, a conclusion may be drawn that sizes for New Balance running shoes are on average a half-size smaller than sizes for Adidas running shoes, allowing a recommendation for New Balance running shoes to be adjusted accordingly. Any of numerous types of analysis and/or adjustments may be performed, as embodiments of the invention are not limited in this respect.

Process 200 then proceeds to act 280, wherein a determination is made whether sufficient information has been gathered to make a recommendation. If so, process 200 proceeds to act 250, wherein a recommendation is made, as described above. If not, process 200 proceeds to act 290, wherein an indication is given to the consumer that a fit recommendation can not be given. This indication may be provided in any of numerous ways, such as by causing information indicating that a recommendation can not be made to be presented on a display. Embodiments of the invention are not limited to any particular manner of implementation.

At the completion of act 290, process 200 completes.

Figure 5:
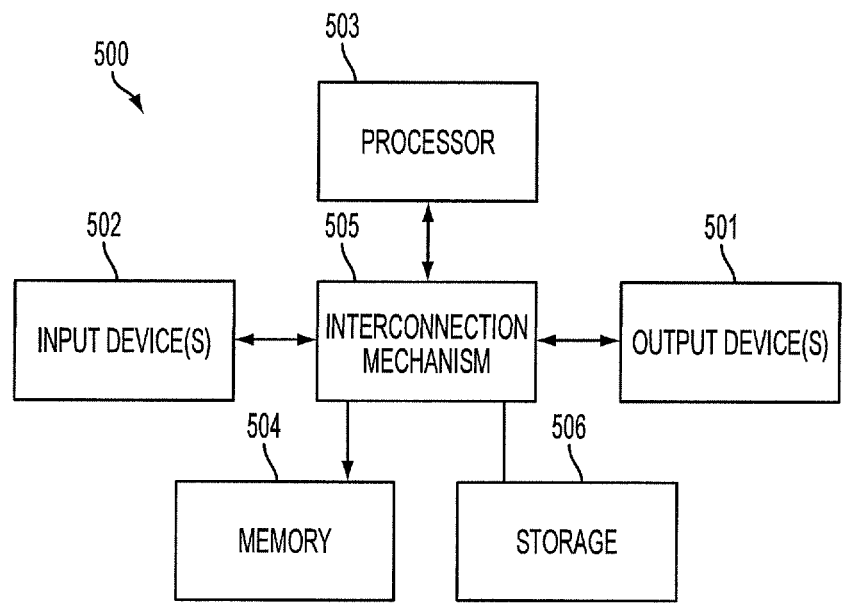
FIG. 5 is a block diagram depicting an example computer on which some embodiments of the invention may be implemented.

Various aspects of the systems and methods for practicing features of the invention may be implemented on one or more computer systems, such as the exemplary computer system 500 shown in FIG. 5. Computer system 500 includes input device(s) 502, output device(s) 501, processor 503, memory system 504 and storage 506, all of which are coupled, directly or indirectly, via interconnection mechanism 505, which may comprise one or more buses, switches, networks and/or any other suitable interconnection. The input device(s) 502 receive(s) input from a user or machine (e.g., a human operator), and the output device(s) 501 display(s) or transmit(s) information to a user or machine (e.g., a liquid crystal display). The input and output device(s) can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

The processor 503 typically executes a computer program called an operating system (e.g., a Microsoft Windows-family operating system, or any other suitable operating system) which controls the execution of other computer programs, and provides scheduling, input/output and other device control, accounting, compilation, storage assignment, data management, memory management, communication and data-flow control. Collectively, the processor and operating system define the computer platform for which application programs and other computer program languages are written.

Figure 6:
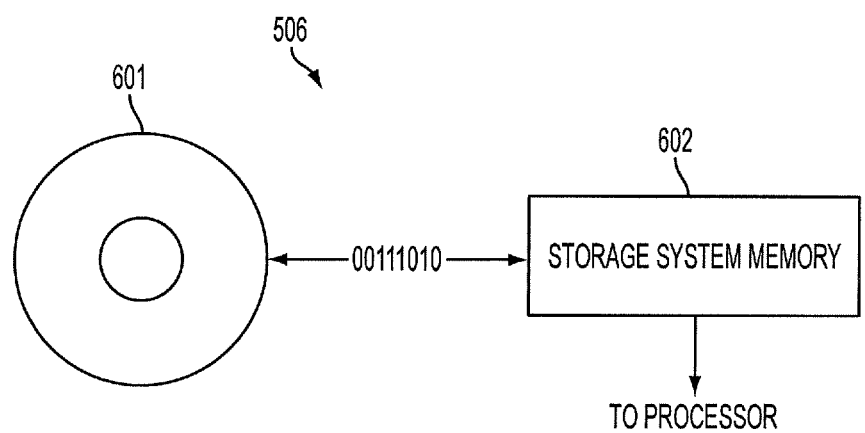
FIG. 6 is a block diagram depicting an example memory on which instructions embodying aspects of the present invention may be stored.

Processor 503 may also execute one or more computer programs to implement various functions. These computer programs may be written in any type of computer program language, including a procedural programming language, object-oriented programming language, macro language, or combination thereof. These computer programs may be stored in storage system 506. Storage system 506 may hold information on a volatile or non-volatile medium, and may be fixed or removable. Storage system 506 is shown in greater detail in FIG. 6.

Storage system 506 may include a tangible computer-readable and -writable non-volatile recording medium 601, on which signals are stored that define a computer program or information to be used by the program. The recording medium may, for example, be disk memory, flash memory, and/or any other article(s) of manufacture usable to record and store information. Typically, in operation, the processor 503 causes data to be read from the nonvolatile recording medium 601 into a volatile memory 602 (e.g., a random access memory, or RAM) that allows for faster access to the information by the processor 503 than does the medium 601. The memory 602 may be located in the storage system 506 or in memory system 504, shown in FIG. 5. The processor 503 generally manipulates the data within the integrated circuit memory 504, 602 and then copies the data to the medium 601 after processing is completed. A variety of mechanisms are known for managing data movement between the medium 601 and the integrated circuit memory element 504, 602, and the invention is not limited to any mechanism, whether now known or later developed. The invention is also not limited to a particular memory system 504 or storage system 506.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

It should also be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound-generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer-readable medium (or multiple computer-readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or one or more other non-transitory, tangible computer-readable storage media) encoded with one or more programs that, when executed on one or more computers or other processors, perform methods that implement the various embodiments of the invention discussed above. The computer-readable medium or media may, for example, be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than that which is illustrated and described, which may include performing some acts simultaneously, even though shown as sequential acts in the illustrative embodiments described herein.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of employing at least one computer to generate a recommendation, for a subject consumer, of a size of a subject item for which a plurality of sizes is available, the method comprising:
   (A) receiving at the at least one computer a request for a recommendation of a size of the subject item to fit the subject consumer;
   (B) using the at least one computer, identifying a cluster of consumers, comprising a plurality of consumers, to which the subject consumer belongs, and analyzing information relating to the cluster of consumers;
   (C) determining, by the at least one computer, whether a recommendation of a size of the subject item is to be made as a result of the analyzing in (B);
   (D) if it is determined in (C) that a recommendation of a size of the subject item is not to be made as a result of the analyzing in (B), identifying, by the at least one computer, a cluster of items, comprising a plurality of items, to which the subject item belongs, and analyzing information relating to the cluster of items;
   (E) determining, by the at least one computer, whether a recommendation of a size of the subject item is to be made as a result of the analyzing in (D); and
   (F) if it is determined in (C) or in (E) that a recommendation of a size of the subject item is to be made, using the at least one computer to generate a recommendation for a size of the subject item as being likely to fit the subject consumer.

2. The method of claim 1, wherein the identifying in (B) comprises identifying a cluster of consumers that is defined by commonality with respect to one or more attributes comprising self-reported and/or inferred body measurements, body shape attributes, and/or sales history.

3. The method of claim 1, wherein the identifying in (B) comprises identifying a plurality of clusters of consumers to which the subject consumer belongs, each of the plurality of clusters being defined by commonality with respect to a different attribute.

4. The method of claim 1, wherein the analyzing in (B) comprises determining whether a size of the subject item has been successfully purchased by at least one other consumer in the cluster.

5. The method of claim 4, wherein the determining comprises determining whether a size of the subject item was designated as a favorite by at least one other consumer in the cluster.

6. The method of claim 1, wherein (F) comprises providing an indication of confidence that the subject item will fit the subject consumer.

7. The method of claim 6, wherein (C) comprises providing an indication of confidence that the subject item will fit the subject consumer along each of a plurality of dimensions.

8. The method of claim 1, wherein the cluster of items to which the subject item belongs comprises items purchased by the plurality of consumers, and wherein (D) comprises analyzing information relating to purchases and/or returns by the plurality of consumers of a size of at least one other item in the cluster of items to determine a size of the subject item likely to fit the subject consumer.

9. The method of claim 8, wherein the analyzing comprises employing a known relationship between sizes of the subject item and sizes of the at least one other item in the cluster to determine a size of the subject item likely to fit the subject consumer.

10. The method of claim 1, wherein the subject item is an item of apparel or a pair of shoes.

11. At least one non-transitory computer readable medium having encoded thereon instructions which, when executed, perform a method of recommending, to a subject consumer, a size of a subject item for which a plurality of sizes is available, the method comprising:
(A) receiving a request for a recommendation of a size of the subject item to fit the subject consumer;
(B) identifying a cluster of consumers, comprising a plurality of consumers, to which the subject consumer belongs, and analyzing information relating to the cluster of consumers;
(C) determining whether a recommendation of a size of the subject item is to be made as a result of the analyzing in (B);
(D) if it is determined in (C) that a recommendation of a size of the subject item is not to be made as a result of the analyzing in (B), identifying a cluster of items, comprising a plurality of items, to which the subject item belongs, and analyzing information relating to the cluster of items;
(E) determining whether a recommendation of a size of the subject item is to be made as a result of the analyzing in (D); and
(F) if it is determined in (C) or in (E) that a recommendation of a size of the subject item is to be made, recommending a size of the subject item as being likely to fit the subject consumer.

12. The at least one non-transitory computer readable medium of claim 11, wherein the identifying in (B) comprises identifying a cluster that is defined by commonality with respect to one or more attributes comprising self-reported and/or inferred body measurements, body shape attributes, and/or sales history.

13. The at least one non-transitory computer readable medium of claim 11, wherein the identifying in (B) comprises identifying a plurality of clusters of consumers to which the subject consumer belongs, each of the plurality of clusters being defined by commonality with respect to a different attribute.

14. The at least one non-transitory computer readable medium of claim 11, wherein the analyzing in (B) comprises determining whether a size of the subject item has been successfully purchased by at least one other consumer in the cluster.

15. The at least one non-transitory computer readable medium of claim 14, wherein the analyzing in (B) comprises determining whether a size of the subject item was designated as a favorite by at least one other consumer in the cluster.

16. The at least one non-transitory computer readable medium of claim 11, wherein (F) comprises providing an indication of confidence that the subject item will fit the subject consumer.

17. The at least one non-transitory computer readable medium of claim 11, wherein the cluster of items to which the subject item belongs comprises items purchased by the plurality of consumers, and wherein (D) comprises analyzing information relating to purchases and/or returns by the plurality of consumers of a size of at least one other item in the cluster of items to determine a size of the subject item likely to fit the subject consumer.

18. The at least one non-transitory computer readable medium of claim 17, wherein the analyzing comprises employing a known relationship between sizes of the subject item and sizes of the at least one other item in the cluster to determine a size of the subject item likely to fit the subject consumer.

19. A system, comprising:
at least one storage facility storing information on past purchases, by a plurality of consumers, of a plurality of items;
at least one computer processor programmed to:
receive a request for a recommendation of a size of a subject item to fit a subject consumer, wherein a plurality of sizes of the subject item is available;
identify a cluster of consumers, comprising at least a subset of the plurality of consumers, to which the subject consumer belongs, and analyze information relating to purchases by one or more of the cluster of consumers;
determine whether a recommendation of a size of the subject item is to be made as a result of the analyzing of the information relating to purchases by one or more of the cluster of consumers;
if it is determined that a recommendation of a size of the subject item is not to be made as a result of the analyzing of the information relating to purchases by one or more of the cluster of consumers, identify a cluster of items, comprising a plurality of items, to which the subject item belongs, and analyze information relating to the cluster of items;
determine whether a recommendation of a size of the subject item is to be made as a result of the analyzing of the information relating to the cluster of items;
if it is determined that a recommendation of a size of the subject item is to be made as a result of the analyzing of the information relating to purchases by one or more of the cluster of consumers, or as a result of the analyzing of the information relating to the cluster of items, identify a size of the subject item likely to fit the subject consumer; and
recommend the identified size of the subject item.

* * * * *